United States Patent
Miyajima et al.

(10) Patent No.: US 6,865,064 B2
(45) Date of Patent: Mar. 8, 2005

(54) DRIVE APPARATUS AND DRIVE METHOD FOR ELECTROMAGNETIC DRIVE ACTUATOR

(75) Inventors: Hiroshi Miyajima, Hachioji (JP); Masahiro Nishio, Hachioji (JP)

(73) Assignee: Olympus Corporation, Tokyo (JP)

(*) Notice: Subject to any disclaimer, the term of this patent is extended or adjusted under 35 U.S.C. 154(b) by 381 days.

(21) Appl. No.: 10/224,369

(22) Filed: Aug. 20, 2002

(65) Prior Publication Data

US 2003/0042801 A1 Mar. 6, 2003

(30) Foreign Application Priority Data

| Aug. 29, 2001 | (JP) | ............................. 2001-260362 |
| Feb. 14, 2002 | (JP) | ............................. 2002-037266 |

(51) Int. Cl.[7] ............................................. H01H 47/00
(52) U.S. Cl. ..................... 361/160; 361/152; 361/203
(58) Field of Search ............................. 361/152, 154, 361/160, 203

(56) References Cited

U.S. PATENT DOCUMENTS

| 4,796,112 | A | * | 1/1989 | Mizukami et al. ....... 360/78.07 |
| 5,168,203 | A |   | 12/1992 | Tepavcevic ................. 318/701 |
| 5,739,651 | A |   | 4/1998 | Miyazawa et al. .......... 318/439 |
| 6,133,701 | A | * | 10/2000 | Gokturk et al. ............. 318/114 |
| 6,693,622 | B1 | * | 2/2004 | Shahoian et al. ........... 345/156 |

FOREIGN PATENT DOCUMENTS

| EP | 0 692 729 A1 | 1/1996 | ........... G02B/26/10 |
| EP | 1 191 678 A2 | 3/2002 | ............ H02P/7/00 |
| JP | 10-207973 | 8/1998 | ............ G06K/7/10 |
| JP | 11-242180 | 9/1999 | ........... G02B/26/08 |
| JP | 2001-305471 | 10/2001 | ........... G02B/26/10 |

OTHER PUBLICATIONS

Patent Abstracts of Japan Publication No. 63223613, published Sep. 19, 1988 (Japanese application No. 62057125, date of application Mar. 12, 1987).

Patent Abstracts of Japan Publication No. 10207973, published Aug. 7, 1998 (Japanese application No. 09046876, date of application, Jan. 23, 1997).

Patent Abstracts of Japan Publication No. 64002015, published Jan. 6, 1989 (Japanese application No. 62158219, date of application, Jun. 25, 1987).

Miyajima, H., et al., "An Electromagnetic Optical Scanner With Polyimide–Based Hinges", 10th International Conference on Solid–State Sensors and Actuators (Transducers 1999), Jun. 7–10, 1999, Sendai, Japan, pp. 372–375.

* cited by examiner

*Primary Examiner*—Stephen W. Jackson
(74) *Attorney, Agent, or Firm*—Scully, Scott, Murphy & Presser

(57) ABSTRACT

A drive apparatus for an electromagnetic drive type actuator, which includes a movable element, a fixed element, a connection element, a magnetic field generation element, and a drive coil, such that the movable element is caused to oscillate by an interaction between a current flowing through the drive coil and a magnetic field generated by the magnetic field generation element, comprises a drive signal supply element, which supplies to the drive coil a current signal with a periodic waveform that has a frequency substantially equal to a resonance frequency of the movable element and whose current value is zero in a fixed period in one cycle, and an oscillation detection element, which detects an oscillation state based on a timing of a zero-cross point of a voltage waveform between both ends of the drive coil in a period corresponding to the period in which the current value is zero.

39 Claims, 9 Drawing Sheets

Waveform A

Waveform A

Waveform B

Waveform B

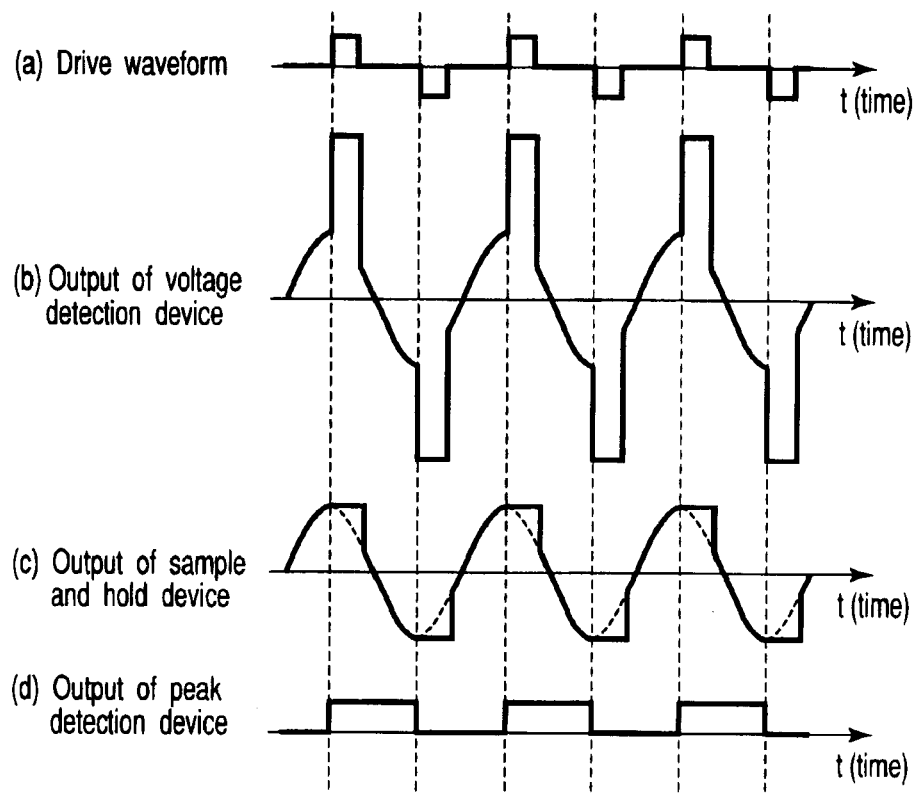
F I G. 19
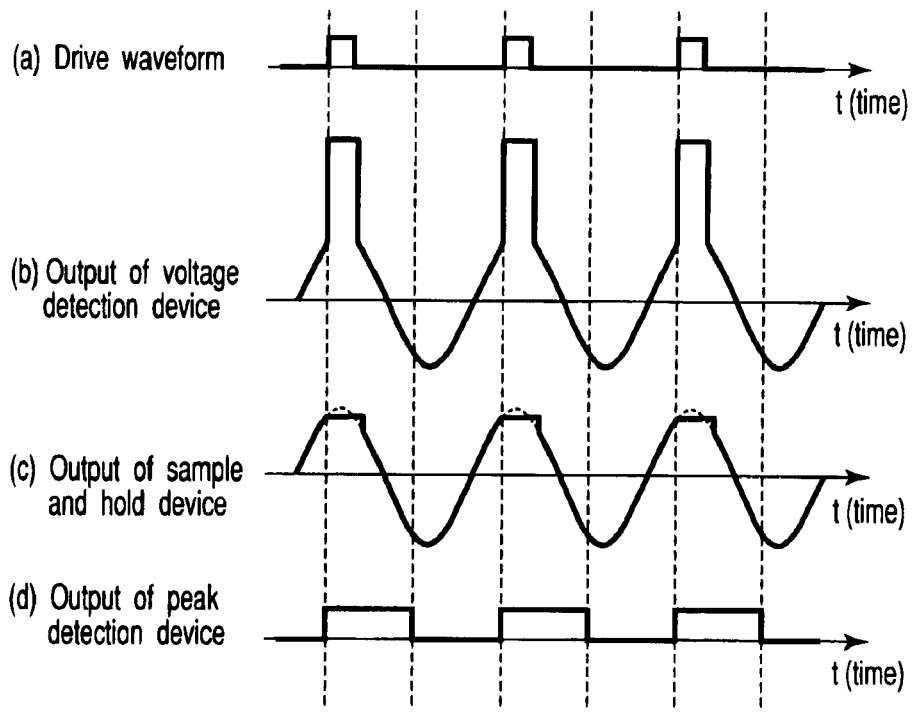
F I G. 20

DRIVE APPARATUS AND DRIVE METHOD FOR ELECTROMAGNETIC DRIVE ACTUATOR

CROSS-REFERENCE TO RELATED APPLICATIONS

This application is based upon and claims the benefit of priority from the prior Japanese Patent Applications No. 2001-260362, filed Aug. 29, 2001; and No. 2002-037266, filed Feb. 14, 2002, the entire contents of both of which are incorporated herein by reference.

BACKGROUND OF THE INVENTION

1. Field of the Invention

The present invention relates to a drive apparatus and a drive method for an electromagnetic drive type actuator.

2. Description of the Related Art

There is known an electromagnetic drive type actuator having: a movable element; a fixed element; a connection element connecting these elements; a magnetic field generation element fixed to one of the fixed element and the movable element; and a drive coil fixed to the other one of the fixed element and the movable element. This type of electromagnetic drive actuator is driven by supplying a pulsed current to the drive coil, for example, so that the movable element is oscillated with respect to the fixed element in the resonance state by the force acting between the drive coil and the magnetic field generation element.

Some of the electromagnetic drive type actuators have an oscillation detection sensor for detecting a deflection angle or a deflection angular velocity of the movable element for the further accurate control, but some do not have such an oscillation detection sensor to get a large deflection angle or reduce the size.

In drive apparatuses for the electromagnetic drive type actuator having no oscillation detection sensor, some can detect a deflection angle or a deflection angular velocity of the movable element based on the voltage between the both ends of the drive coil. Jpn. Pat. Appln. KOKAI publication No. 10-207973 entitled "drive circuit for vibration mirror type scanning apparatus" discloses a conventional example of such a drive apparatus.

This drive apparatus subjects the actuator to resonance drive by applying a pulsed drive signal to a vibration mirror drive coil (VM coil). Further, this drive apparatus detects the voltage between the both ends of the vibration mirror drive coil by a voltage sampler, and raises the pulsed drive signal with a timing at which the detection voltage becomes zero. Furthermore, the pulse width is determined by comparing a peak value of the detection voltage of the voltage sampler with a target voltage.

It is good enough to match rising of the pulsed rive current with the peak of the angular velocity for the efficient drive of the electromagnetic drive actuator. However, the above-described prior art drive apparatus raises the pulsed drive signal with the timing at which the detection voltage of the voltage sampler becomes zero. That is, rising of the pulsed drive current is matched with the timing at which the angular velocity of the vibration mirror becomes zero. Therefore, the drive apparatus in the prior art can not perform the efficient drive.

The drive apparatus in the prior art uses a peak value of the detection voltage as amplitude information. Since the peak value of the detection voltage is readily affected by the disturbance such as noises, there is a doubt in validity of the amplitude information.

The drive apparatus in the prior art adjusts the deflection angle amplitude by changing a pulse width of the drive current. Therefore, the distortion of a signal when eliminating the drive signal overlapped on the detection voltage is increased/decreased in dependence upon the pulse width. Therefore, it is hard for the drive apparatus in the prior art to perform accurate amplitude detection. Furthermore, since the deflection angle amplitude is adjusted by changing the pulse width of the drive current, the pulse width must be less than ¼ of a vibration cycle of the actuator. That is, there is limit in the amplitude adjustment range.

BRIEF SUMMARY OF THE INVENTION

According to one aspect of the present invention, there is provided a drive apparatus for an electromagnetic drive type actuator, which comprises a movable element, a fixed element, a connection element connecting the movable element and the fixed element to allow the movable element to oscillate with respect to the fixed element, a magnetic field generation element provided to one of the fixed element and the movable element, and a drive coil provided to the other one of the fixed element and the movable element, the movable element being caused to oscillate with respect to the fixed element in accordance with a force generated by the interaction between a current flowing through the drive coil and a magnetic field generated by the magnetic field generation element, the drive apparatus comprising: a drive signal supply element, which supplies to the drive coil a current signal with a periodic waveform that has a frequency substantially equal to a resonance frequency of the movable element and whose current value is zero in a fixed period in one cycle; and an oscillation detection element, which detects an oscillation state based on a timing of a zero-cross point of a voltage waveform between both ends of the drive coil in a period corresponding to the period in which the current value is zero.

According to the present invention, there is provided the drive apparatus for an electromagnetic drive type actuator, which has a function capable of accurately and stably detecting an oscillation state of the movable element.

Additional advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 19 shows an output (drive waveform) from the coil drive device, an output from the voltage detection device, an output from the sample and hold device, and an output from the peak detection device of the drive apparatus in FIG. 14, which drives the optical scanner in FIG. 1 with the rectangular wave having the both polarities in accordance with the first drive example;

FIG. 20 shows an output (drive waveform) from a coil drive device, an output from the voltage detection device, an output from the sample and hold device, and an output from the peak detection device of the drive apparatus in FIG. 14, which drives the optical scanner in FIG. 1 with the rectangular wave having the single polarity in accordance with a second drive example (90–d·180/T° phase detection of the deflection angular velocity waveform)

DETAILED DESCRIPTION OF THE INVENTION

Embodiments according to the present invention will now be described hereinafter with reference to the accompanying drawings.

Electromagnetic Drive Type Actuator

Figure 1:
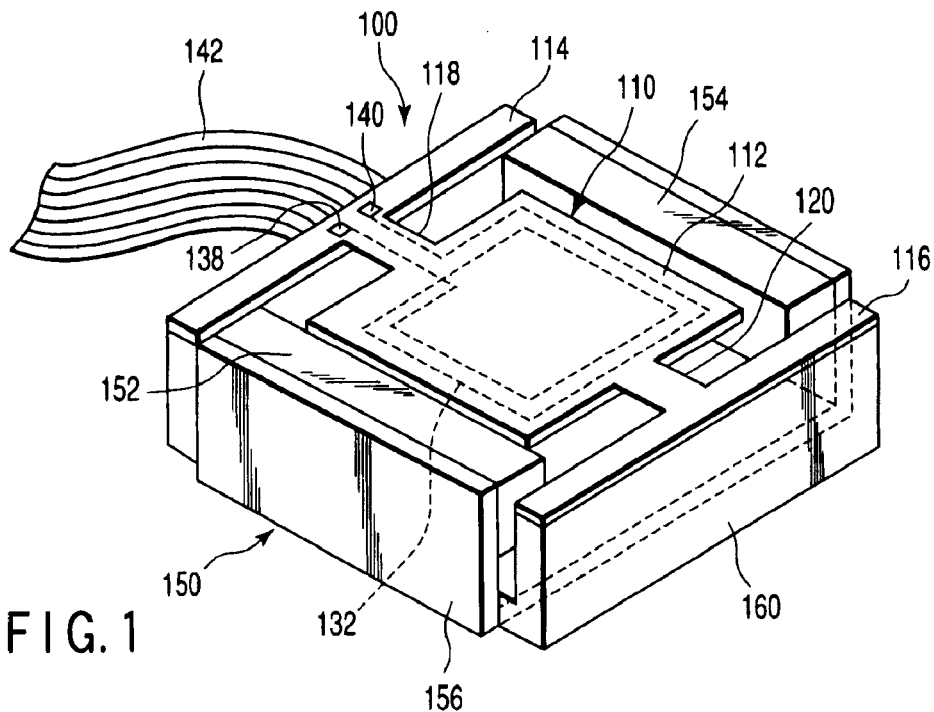
FIG. 1 shows an electromagnetic drive type actuator driven by a drive apparatus according to an embodiment.

FIG. 1 shows an electromagnetic drive type actuator driven by the drive apparatus according to the present embodiment. As shown in FIG. 1, the electromagnetic drive type actuator comprises an electromagnetic type optical scanner manufactured by a micromachine technique.

As shown in FIG. 1, the optical scanner 100 includes an oscillator 110 having a movable element allowed to one-dimensionally oscillate, a magnetic circuit 150 for generating a magnetic field, and a base plate 160 holding them.

The oscillator 110 has a movable portion 112 as the movable element, support portions 114 and 116, which support the movable portion 112, and a pair of torsion bars 118 and 120 as a connection element, which connect the movable portion 112 and the support portions 114 and 116. The torsion bars 118 and 120 support the movable portion 112 to allow the movable portion 112 to oscillate with respect to the support portions 114 and 116 about an axis passing through the torsion bars 118 and 120.

The movable portion 112 has a flat plate shape, and has a front side (face which can be seen in FIG. 1) and a back side (face which can not be seen in FIG. 1), which are substantially parallel. The movable portion 112 has a mirror, which is formed on, e.g., the front face. Alternatively, the front face itself of the movable portion 112 may function as a reflecting surface.

The movable portion 112 has a drive coil 132 formed on the back side. The drive coil 132 extends along the periphery of the movable portion 112. The both ends of the drive coil 132 are respectively connected to electrode pads 138 and 140 provided to the support portion 114 through a wiring running through the torsion bar 18.

The magnetic circuit 150 includes a pair of permanent magnets 152 and 154 as a magnetic field generation element, and a yoke 156 holding the magnets.

The support portions 114 and 116 are fixed to the base plate 160, so that the oscillator 110 is attached to the base plate 160. Further, the yoke 156 is fixed to the base plate 160, so that the magnetic circuit 150 is attached to the base plate 160. In this structure, parts excluding the movable portion 112, the torsion bars 118 and 120, the permanent magnets 152 and 154, and the yoke 156 constitute a fixed element.

The mirror on the front side (or the front side that functions as a reflecting surface) of the movable portion 112 is irradiated with the light beam, and the light beam reflected thereon is one-dimensionally scanned in accordance with oscillation of the movable portion 112.

A drive signal of an alternating current is applied to the electrode pads 138 and 140 through a flexible printed circuit (FPC) 142, so that a current flows to the drive coil 132. The current flowing through the drive coil 132 receives Lorentz force due to the interaction with the magnetic field component in dependence upon its magnitude.

A pair of opposed side portions parallel to the oscillation axis of the drive coil 132 receives the force, which is substantially vertical to the surface (the front side or the back side) of the movable portion 112, due to the Lorentz force received by the currents flowing through the opposed side portions. Moreover, since the currents flowing through a pair of the opposed side portions are opposed to each other, the movable portion 112 receives the couple of forces about the oscillation axis. Therefore, the movable portion 112 turns about the oscillation axis in accordance with the magnitude of the current flowing through the drive coil 132.

Since the drive signal applied to the electrode pads 138 and 140 has an alternating current, the current flowing through the drive coil 132 is an alternating current. Since the directions of the currents are alternately changed, the directions of the couple of forces acting on the movable portion 112 are alternately switched, so that the turning directions of the movable portion 112 are thereby alternately switched. Therefore, the movable portion 112 repeatedly turns (i.e., oscillates) in the both directions about the oscillation axis in a fixed angular range. As a result, a light beam reflected by the movable portion 112 is one-dimensionally scanned.

The movable portion 112 has an inherent resonance frequency, which depends on the structure, material, etc. of the torsion bars 118 and 120. The movable portion 112 oscillates with a maximum deflection angle when a frequency of the drive signal matches with the resonance frequency.

Figure 2:
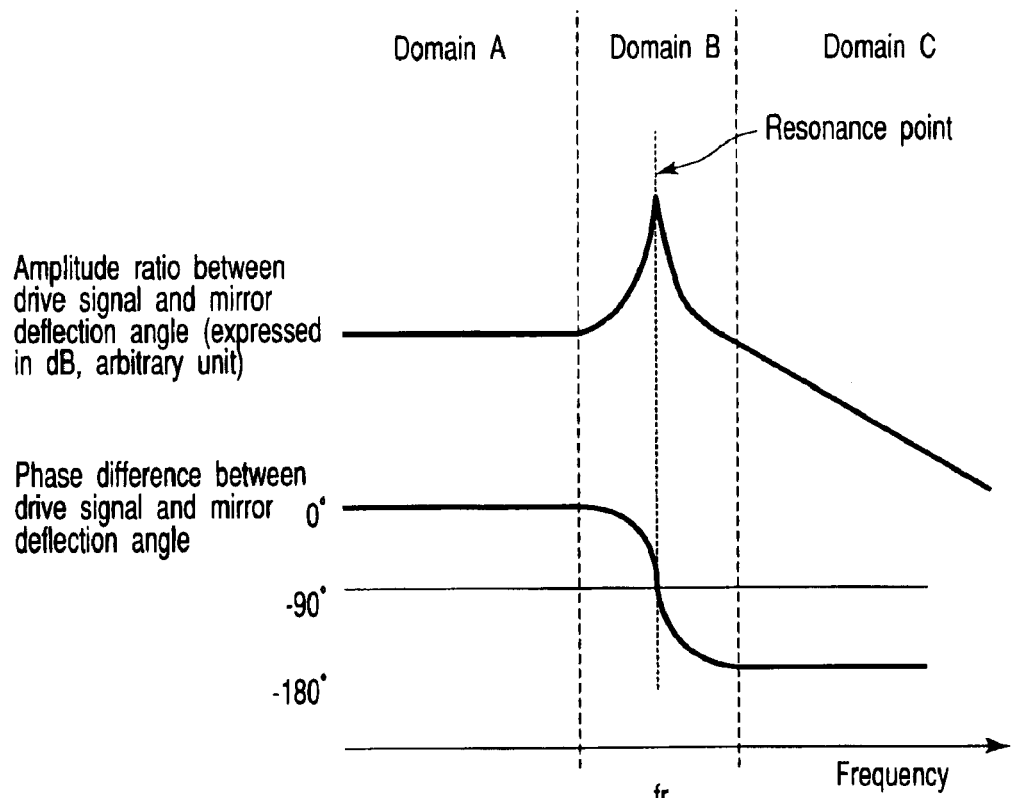
FIG. 2 shows a frequency response characteristics of the deflection angle relative to the drive frequency as the electromagnetic drive type actuator or optical scanner in FIG. 1 is driven with sine waves.

FIG. 2 shows a frequency response characteristics of the deflection angle relative to the drive frequency as the optical scanner 100 is driven with sine waves. Description will now be given as to the behavior of the optical scanner 100, which is divided into three domains A, B and C in accordance with a frequency of the drive signal.

The domain A is a frequency band that is sufficiently low with respect to the resonance frequency $f_r$. In this domain, the deflection angle of the movable portion 112 does not depend on the frequency, and there is no phase difference between the drive signal and the deflection angle. That is, the behavior of the optical scanner 100 basically follows up the drive signal.

The domain B is a frequency band near the resonance frequency $f_r$. In this domain, increase in the deflection angle and delay in phase are generated, and the behavior of the optical scanner 100 does not necessarily follow up the drive signal. The deflection angle is influenced by a frequency and an attenuation ratio.

The domain C is a frequency band that is sufficiently high with respect to the resonance frequency $f_r$. In this domain, the influence of the torsion bars 118 and 120 may be basically ignored. That is, if the drive force is fixed, the response is made so that the angular acceleration of the movable portion 112 can be fixed.

To sum up, in the low-frequency domain, the deflection angle of the movable portion 112 is fixed irrespective of a frequency of the drive signal, and the gain of the deflection angle is very high with the resonance frequency. In the high-frequency domain, the deflection angle of the movable portion 112 is rapidly decreased in accordance with increase in frequency (because the response is made so that the angular acceleration becomes fixed).

With the resonance frequency in the domain B, the phase of the deflection angle is delayed 90 degrees with respect to the drive signal. When the frequency of the drive signal is increased/decreased with respect to the resonance frequency, the phase relationship between the drive signal and the deflection angle is increased/decreased near 90 degrees, and the deflection angle is reduced with respect to resonance.

Figure 3:
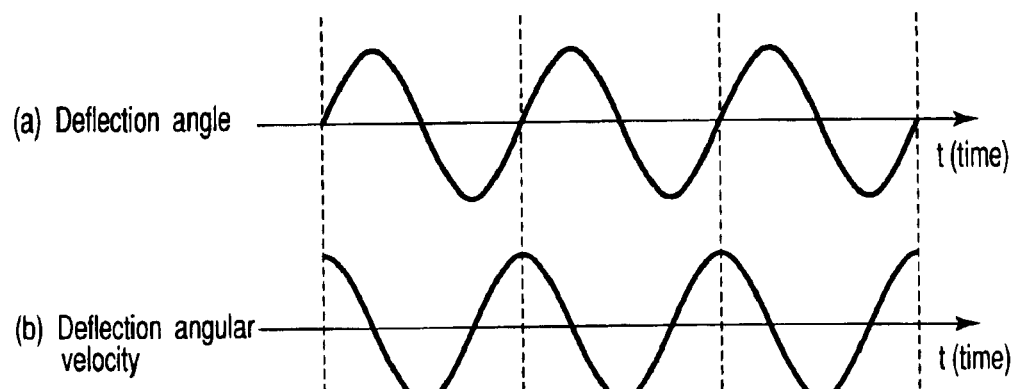
FIG. 3 shows a deflection angle and a deflection angular velocity with the optical scanner depicted in FIG. 1 driven with a sine wave.
Figure 4:
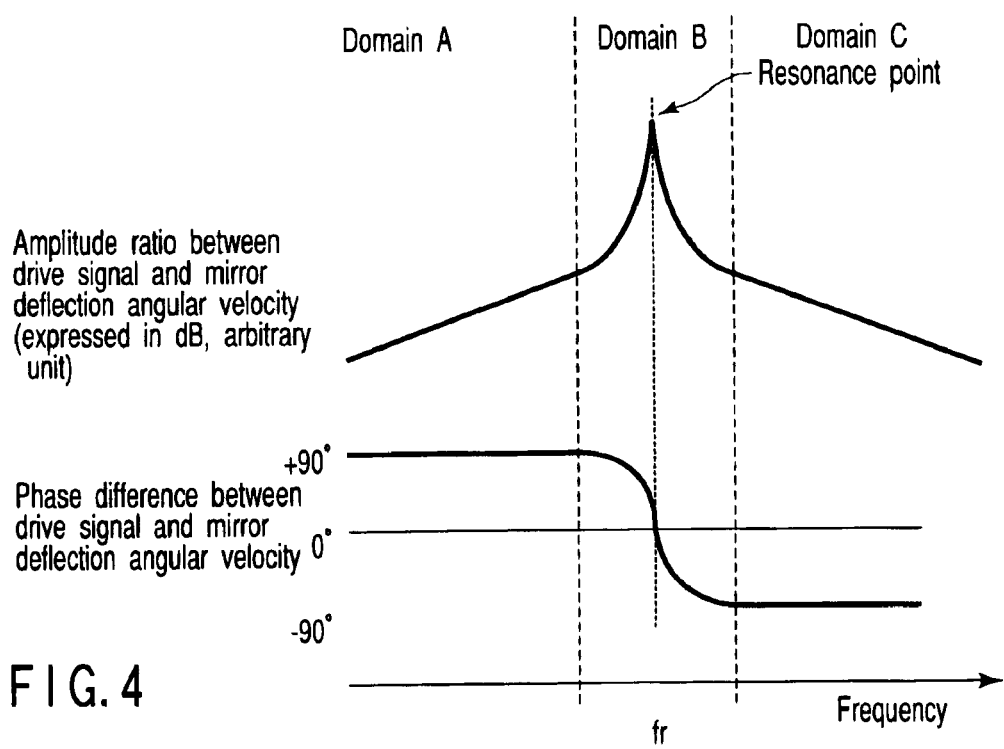
FIG. 4 shows a frequency response characteristics of the deflection angular velocity relative to the drive frequency as the optical scanner in FIG. 1 is driven with sine waves.

Considering the relationship between the drive signal and the deflection angular velocity based on this, since the deflection angular velocity is a differential value of the deflection angle, the phase of the deflection angular velocity advances 90 degrees from that of the deflection angle as shown in FIG. 3. Therefore, the drive signal and the deflection angular velocity are in phase with the resonance frequency. FIG. 4 shows a frequency response characteristics of the deflection angular velocity relative to the drive frequency.

Although the above has described the case where the drive signal has a sine wave, the similar perspective can be applied to the rectangular pulsed drive signal.

When driving the optical scanner having the characteristic shown in FIG. 2 with the alternating current having the rectangular wave, considering that the rectangular wave is a composite of a plurality of sine waves having different frequencies may suffice. The rectangular wave is decomposed to respective frequency components by performing development of Fourier series. In other words, the rectangular pulsed drive signal can be expressed by overlap of since waves corresponding to an odd-numbered multiple of the fundamental frequency component by development of Fourier series.

For example, for the resonance frequency $f_r$, a rectangular wave function expressed by $$I(t) = I_0 \quad \left(0 < t < \frac{1}{2f_r}\right) \quad (1)$$
$$= -I_0 \quad \left(\frac{1}{2f_r} < t < \frac{1}{f_r}\right)$$

can be written as a Fourier series as follows:

$$I(t) = \frac{4I_0}{\pi}\left(\sin 2\pi f_r t + \frac{1}{3}\sin 6\pi f_r t + \frac{1}{5}\sin 10\pi f_r t + \ldots\right). \quad (2)$$

Figure 5:
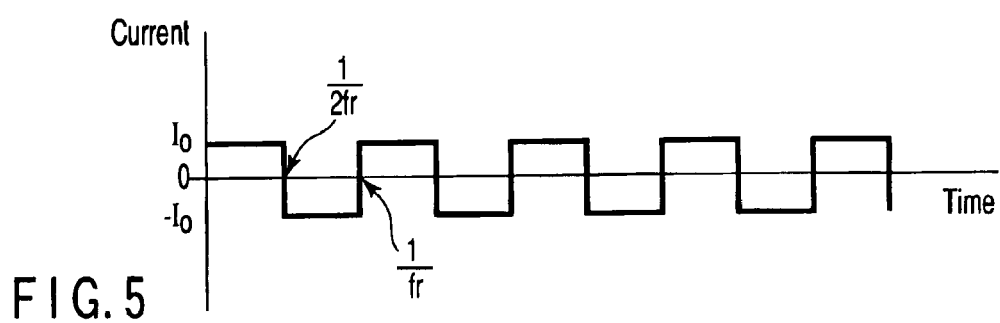
FIG. 5 shows a drive signal having a rectangular wave represented by an equation (2) in a time domain.
Figure 6:
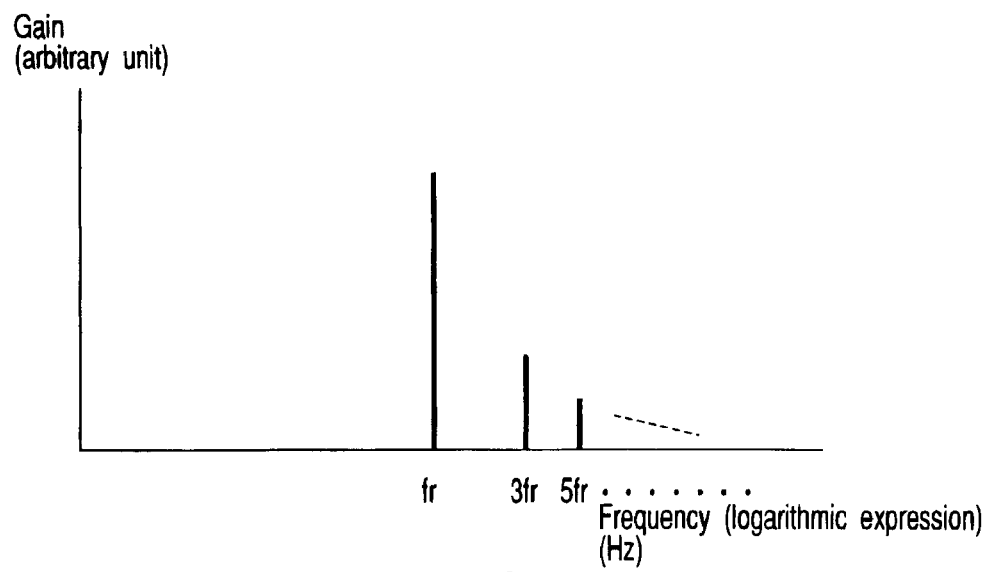
FIG. 6 shows a drive signal having a rectangular wave represented by an equation (2) in a frequency domain.

FIGS. 5 and 6 respectively show I(t) represented in the time domain and in the frequency domain, respectively.

When the drive signal is decomposed to the respective frequency components, a composite of the responses from the optical scanner to the respective frequencies is a response from the optical scanner to the rectangular wave drive signal.

According to the equation (2), the frequency components of the rectangular wave signal are $f_r$, $3f_r$, $5f_r$, ..., and all frequency components except the fundamental wave component (resonance frequency component) belong to the domain C in FIG. 2. Therefore, as compared with the response deflection angle of the fundamental wave component (resonance frequency component), the response deflection angle of each higher harmonic component (each frequency component corresponding to an integral multiple of the resonance frequency component) is small. In addition, a coefficient value in each higher harmonic component is also small. Therefore, the response deflection angle of the optical scanner relative to each of these higher harmonic components can be ignored as compared with the response deflection angle to the fundamental component (resonance frequency component).

Figure 7:
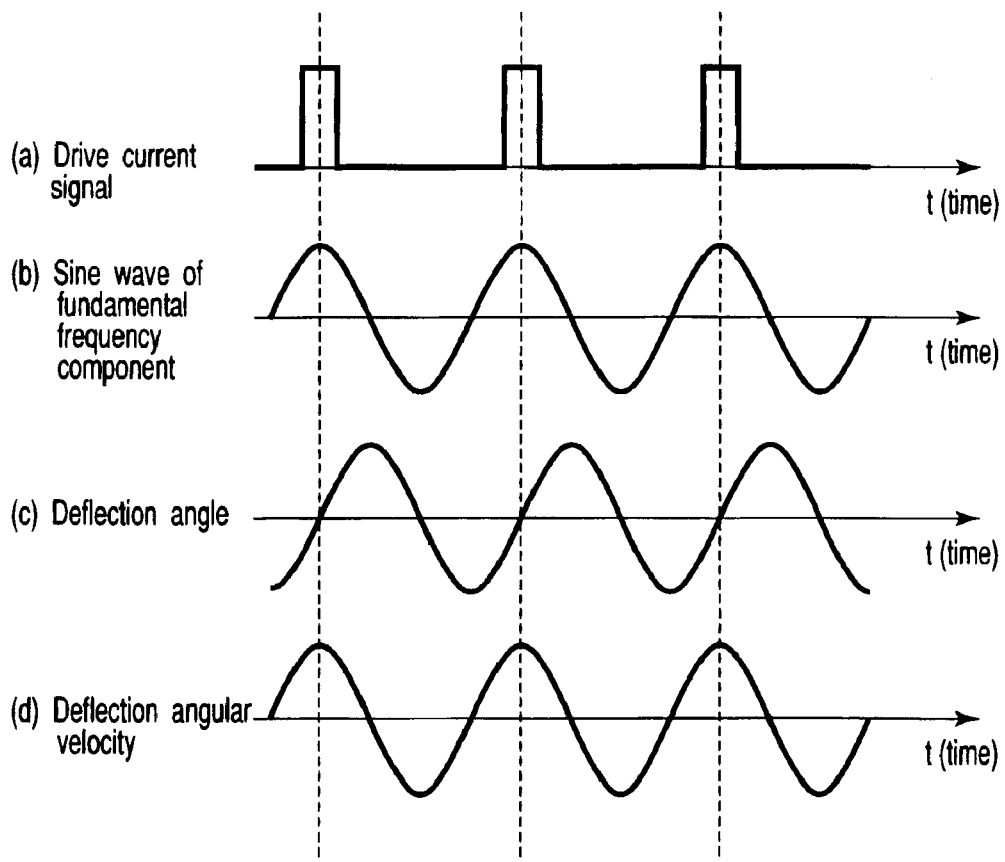
FIG. 7 shows a drive current signal, a sine wave of a fundamental frequency component of the drive current signal, a deflection angle, and a deflection angular velocity, with the optical scanner in FIG. 1 driven with a rectangular wave with the single polarity.

For example, the rectangular pulsed drive signal shown in FIG. 7 under item (a) is expressed by overlap of the since wave of the fundamental frequency component and the sine waves having frequency components which are threefold, fivefold, sevenfold, ... with the since wave shown in FIG. 7 under item (b) as a fundamental frequency.

Since the response deflection angle of the optical scanner relative to the higher harmonic component may be substantially ignored, the deflection angle and the deflection angular velocity have the since waves as shown in FIG. 7 under item (c) and FIG. 7 under item (d), respectively. The phase of the deflection angle and that of the deflection angular velocity are different from each other by 90 degrees, and the peak of the deflection angular velocity is synchronized with the pulse of the drive current signal.

In this manner, when driven with the resonance frequency, even if the drive waveform has a rectangular pulse shape, the response from the optical scanner becomes the substantially sinusoidal response.

Figure 8:
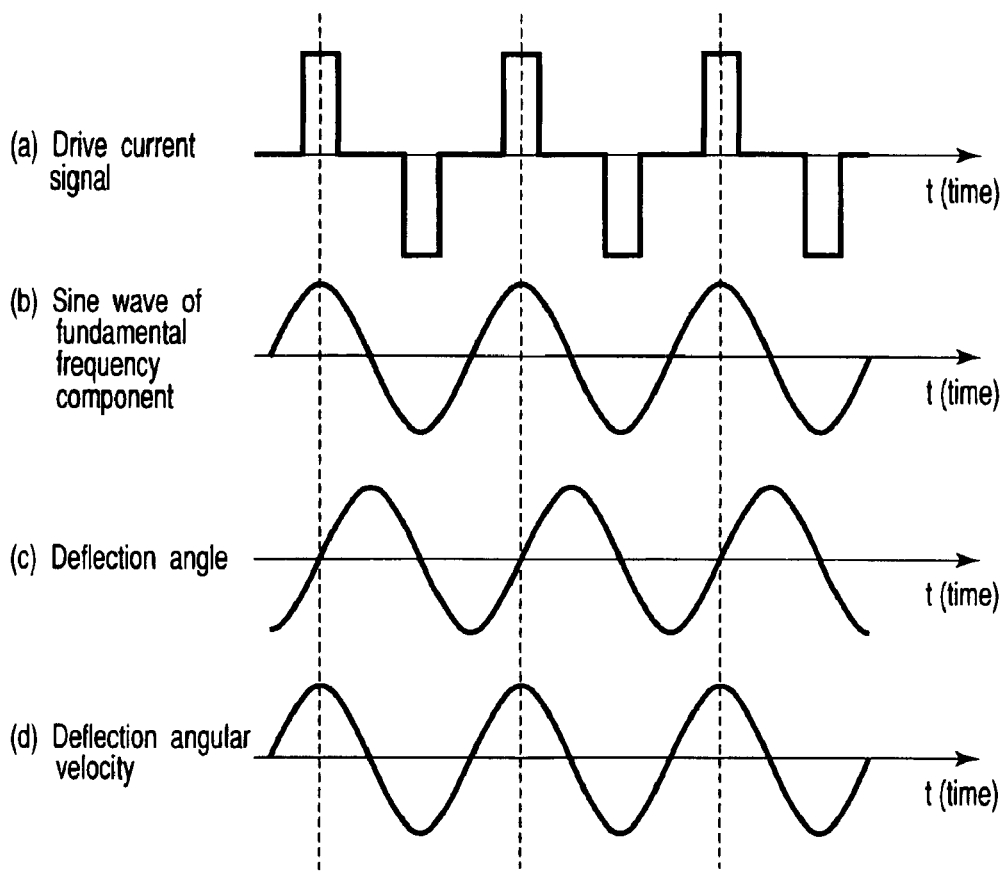
FIG. 8 shows a drive current signal, a sine wave of a fundamental frequency component of the drive current signal, a deflection angle, and a deflection angular velocity, with the optical scanner in FIG. 1 driven with a rectangular wave with the both polarities.

Additionally, this may be also applied to the pulsed drive signal having the both polarities shown in FIG. 8 under item (a), and the sine wave of the fundamental frequency is as shown in FIG. 8 under item (b), and the deflection angle and the deflection angular velocity are as shown in FIG. 8 under items (c) and (d), respectively.

First Embodiment

Figure 9:
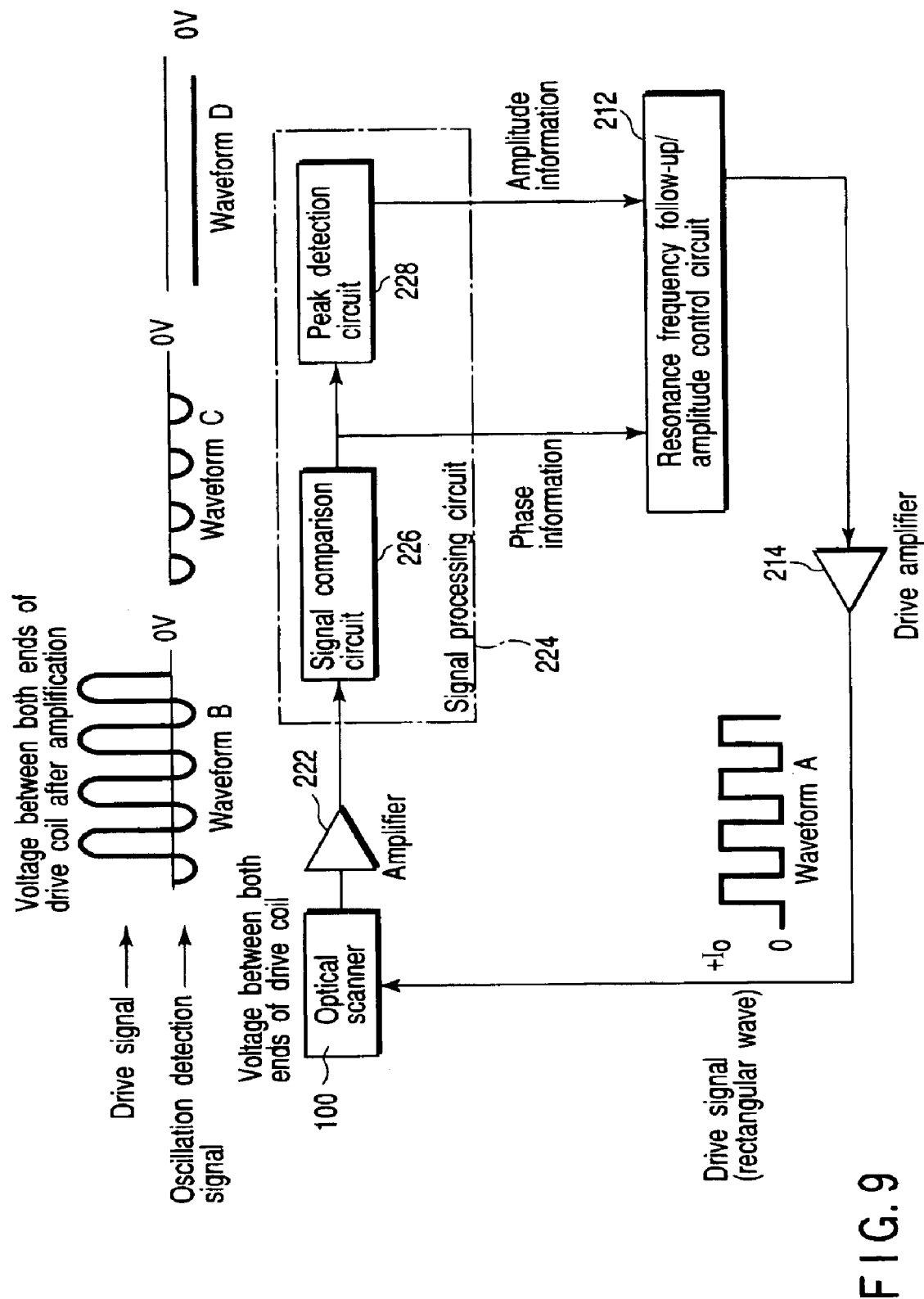
FIG. 9 shows a first embodiment of a drive apparatus according to the present invention for driving the optical scanner illustrated in FIG. 1.

FIG. 9 shows a structure of the drive apparatus for driving the above-described optical scanner 100. As shown in FIG. 9, the drive apparatus includes a resonance frequency follow-up/amplitude control circuit 212 and a driver amplifier 214, which constitute a drive signal supply element, which supplies a drive signal to a drive coil, in order to pass the current to the drive coil 132 of the optical scanner 100, and an amplifier 222 and a signal processing circuit 224, which constitute an oscillation detection element, which detects an oscillation state of the movable portion 112 based on the voltage between the both ends of the drive coil 132.

As indicated by the waveform A in FIG. 9, the drive signal is a rectangular wave current signal that has a frequency $f_r$ equal to the resonance frequency of the movable portion 112 and whose current value is 0 in a fixed period in one cycle and is $I_0$ in the remaining period. The period in which the current value is $I_0$ and the period in which the current value is 0 are both $1/(2f_r)$. In other words, the drive signal has a rectangular wave having a period in which flow of the current stops in a cycle of $1/f_r$.

The drive signal having a rectangular wave can maximize the energy which can be applied in a fixed period, and the maximum amplitude can be obtained when, e.g., there is a maximum current limit.

In the optical scanner 100, when the drive signal with the rectangular wave is supplied to the drive coil 132, the movable portion 112 oscillates with the sinusoidal wave in the resonance state, namely, at a frequency equal to the resonance frequency. As described above, in the optical scanner 100 driven with the rectangular wave, since the response of the higher harmonic component may be substantially ignored, the sine wave-like response is obtained at the resonance frequency. Therefore, as indicated by the waveform B in FIG. 9, the voltage between the both ends of the drive coil 132 in a half of one cycle has a substantially rectangular wave, and that in the remaining half of the cycle has a substantially sinusoidal wave.

The part with the substantially rectangular wave corresponds to a period in which the current value of the drive signal is $I_0$. In this period, there is obtained a waveform that the substantially sinusoidal wave indicative of the induced electromotive force generated by oscillation of the drive coil 132 in the magnetic field overlap the rectangular wave having a value that is substantially equal to the potential difference $I_0R$ generated between the both ends of the drive coil 132 by the current value $I_0$ and the resistance value R of the drive coil 132.

The part with the substantially sinusoidal wave corresponds to a period in which the current value of the drive current is 0. In this period, there is simply obtained a waveform having a substantially sinusoidal wave indicative of the induced electromotive force generated by oscillation of the drive coil 132 in the magnetic field. Therefore, the waveform of the induced electromotive force may be used as a signal which detects the oscillation state of the movable portion 112.

That is, it can be said that the voltage signals between the both ends of the drive coil 132 includes the drive signal having a substantially rectangular wave and the oscillation detection signal corresponding to the induced electromotive force having a substantially sinusoidal wave.

The principle of generation of the induced electromotive force is similar to that of the optical scanner to which a detection coil is provided separately from the drive coil, and its detail is described in Jpn. Pat. Appln. KOKAI Publication No. 11-242180, or H Miyajima, et., al., "An electromagnetic optical scanner with polyimide-based hinges", 10th International Conference on Solid-State Sensors and Actuators (Transducers '99), Sendai, Japan, Jun. 7–10, 1999, pp. 372–375 or the like.

The signal processing circuit 224 extracts information concerning the amplitude or phase of oscillation of the movable portion 112, and outputs it to the resonance frequency follow-up/amplitude control circuit 212. Therefore, the signal processing circuit 224 has a signal comparison circuit 226 and a peak detection circuit 228.

The signal comparison circuit 226 divides the voltage signal between the both ends of the drive coil 132 into the drive signal and the oscillation detection signal, and extracts only the oscillation detection signal. Specifically, as indicated by a waveform C in FIG. 9, the signal comparison circuit 226 extracts only a part where the potential is lower than 0 V from the voltage between the both ends of the drive coil 132. The waveform C obtained by the signal comparison circuit 226 includes phase information of the oscillation detection signal, and this is input into the resonance frequency follow-up/amplitude control circuit 212.

As indicated by the waveform D in FIG. 9, the peak detection circuit 228 obtains a maximum value of the output (waveform C) of the signal comparison circuit 226. The waveform D obtained by the peak detection circuit 228 includes the amplitude information, and this is input to the resonance frequency follow-up/amplitude control circuit 212.

The resonance frequency follow-up/amplitude control circuit 212 outputs a drive waveform required for maintaining a fixed amplitude in the resonance state based on the phase information and the amplitude information input thereto. This drive waveform is amplified by a driver amplifier 214, and supplied to the optical scanner 100 as a drive signal.

In this manner, the oscillation state of the movable portion 112 is detected by supplying the drive signal with the rectangular wave that has a frequency substantially equal to the resonance frequency of the movable portion 112 and whose current value is 0 in a fixed period in one cycle to the drive coil 132, and measuring the voltage between the both ends of the drive coil 132 in a period corresponding to the period in which the current value of the drive signal is 0.

It is good enough for the optical scanner 100 driven by the drive apparatus according to this embodiment to have only the drive coil 132 in the movable portion 112, and there is no need to have a detection coil besides the drive coil 132. Therefore, in the optical scanner having the drive coil and the detection coil in the movable element, there is not generated mutual induction between the drive coil and the detection coil which provokes an unavoidable noise component.

Further, since the coil which should be formed in the movable portion 112 is only the drive coil 132, an area to form the coil can be set wider than that in the optical scanner in which the drive coil and the detection coil are formed in the movable element. Furthermore, since the oscillation state of the movable portion 112 is detected by the drive coil 132 positioned near the permanent magnets 152 and 154, oscillation detection is performed with the high sensitivity.

The structure of this embodiment may be modified or changed, of course.

For example, the waveform of the drive signal is not restricted to the substantially rectangular waveform, and any other arbitrary waveform may be used.

Figure 10:
FIG. 10 shows another drive signal waveform, which is substituted for a waveform A in FIG. 9.
Figure 11:
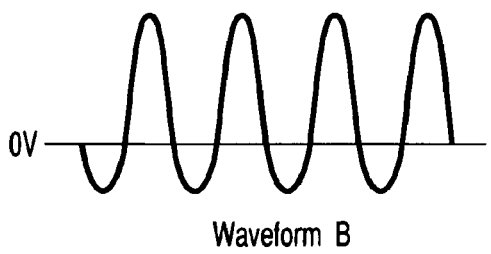
FIG. 11 shows a waveform of a voltage between both ends of a drive coil with respect to the drive signal in FIG. 10.

For example, as shown in FIG. 10, the waveform of the drive signal may be a part of the sine wave, e.g., a half-wave type sine wave in a period excluding the period in which the current value is 0 in one cycle. With respect to this drive signal, as shown in FIG. 11, the voltage between the both ends of the drive coil 132 has a substantially sinusoidal wave corresponding to the drive signal in a half of one cycle, and has a substantially sinusoidal wave corresponding to the induced electromotive force (oscillation detection signal) in the remaining half. In this case, as compared with the waveform A illustrated in FIG. 9, since the higher harmonic components are reduced, and hence the sinusoidal wave type response with less distortion can be obtained. This is effective in drive of the optical scanner whose Q value is relatively low at the time of resonance.

Furthermore, in the waveform A illustrated in FIG. 9, although the period in which the current value is 0 is equal to the period in which the current value is not 0, this ratio may be changed.

Figure 12:
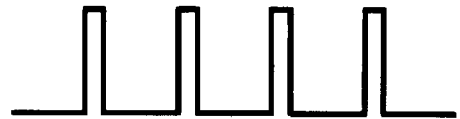
FIG. 12 shows still another drive signal waveform, which is substituted for the waveform A in FIG. 9.
Figure 13:
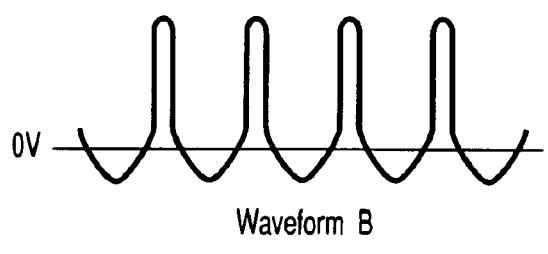
FIG. 13 shows a waveform of a voltage between the both ends of the drive coil with respect to the drive signal in FIG. 12.

For example, as shown in FIG. 12, as to the waveform of the drive signal, the current value may be 0 in a period which is more than a half of one cycle. With respect to this drive signal, as shown in FIG. 13, the voltage between the both ends of the drive coil 132 has a substantially sinusoidal waveform corresponding to the induced electromotive force (oscillation detection signal) in more than a half of one cycle. Since the time ratio of the oscillation detection signal increases, the further accurate oscillation detection can be carried out.

In particular, the oscillation detection signal with the substantially sinusoidal wave in more than a half of one cycle assuredly includes a zero-cross point (point at which the potential is 0 V), and this indicates the deflection angle maximum point (deflected on one side at the maximum level) of the movable portion 112. With the movable portion oscillating, it is convenient to use this deflection angle maximum point in order to detect the deflection angle at an arbitrary point in time. For example, with this point being used as a reference, by obtaining the deflection angle of the movable portion after a fixed time as a function of the time in advance, the deflection angle can be detected based on the time measurement from the reference point. That is, it is possible to be aware of not only the oscillation amplitude but also the oscillation state (deflection angle) at an arbitrary point in time during oscillation. In particular, in case of oscillation in the resonance state, the substantially sinusoidal wave type oscillation is presumed, and the relationship between the elapsed time and the deflection angle from the reference point can be obtained. It is to be noted that the zero-cross point can be detected based on, e.g., an output from the signal comparison circuit 226 illustrated in FIG. 9.

Furthermore, since the oscillation detection signal having a substantially sinusoidal wave over a half of one cycle is obtained, oscillation detection may be performed by detecting an root mean square value of an output (waveform C) from the signal comparison circuit 226 shown in FIG. 9, for example. Oscillation detection using this root mean square value is hardly affected by the noise as compared with detection of the maximum value of the amplitude. That is, in the method of detecting the maximum value of the amplitude, when a signal which exceeds the original amplitude maximum value is generated by any influence, amplitude control is carried out with that value being used as an amplitude maximum value. Therefore, it is interpreted that the amplitude is larger than the actual amplitude, which reduces the level of the drive signal. Thus, the necessary amplitude can not be possibly assured. On the other hand, in oscillation detection using the root mean square value, since instantaneous fluctuations in the oscillation detection signal are averaged, this detection is hardly affected by the noise or the like, and the further stable amplitude detection or control can be performed. In this case, the peak detection circuit 228 shown in FIG. 9 can be substituted by an root mean square value detection circuit.

Moreover, in this embodiment, although description has been given on the electromagnetic type optical scanner manufactured by the micromachine technique, the actuator is not restricted thereto, and any actuator may be used as long as it is an electromagnetic type. It is possible to use a vibrator sensor or the like which demonstrates translation motion or one having a different motion conformation or application.

In addition, in this embodiment, although description has been given on the movable coil type actuator having the coil in the movable element and has the magnetic field generation element (permanent magnets, i.e., magnets) in the fixed element, it is possible to use a movable magnet type actuator which has a magnet (magnetic field generation element) in the movable element and has a coil in the fixed element.

Second Embodiment

Figure 14:
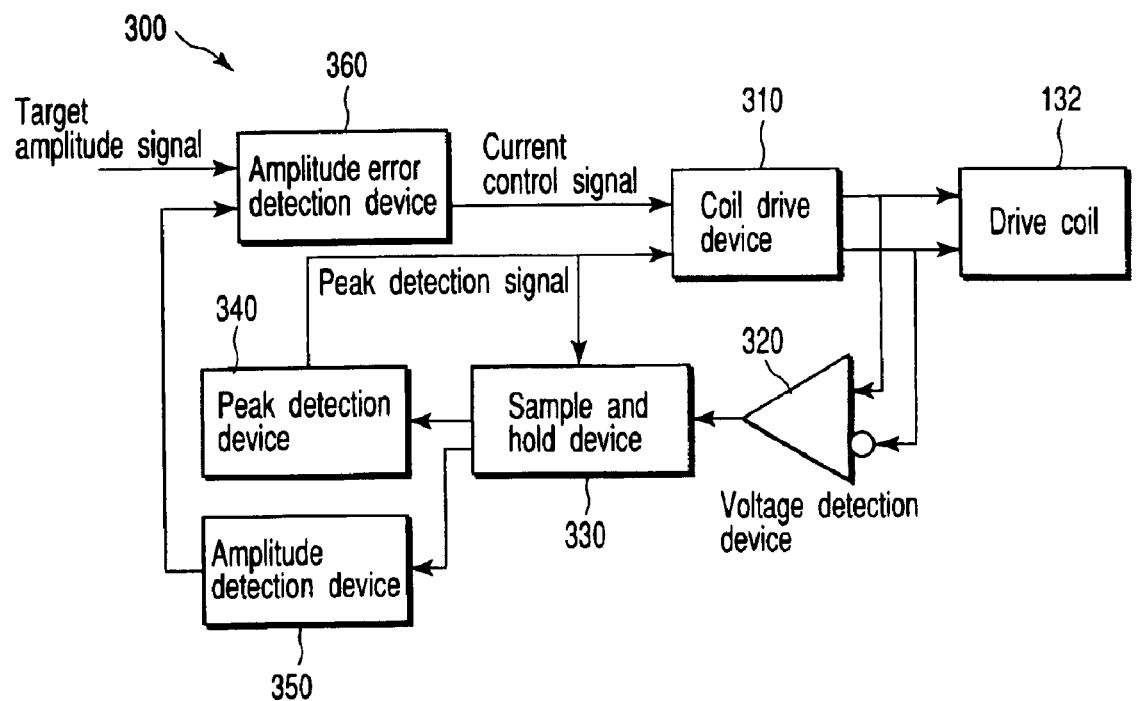
FIG. 14 shows a second embodiment of a drive apparatus according to the present invention for driving the optical scanner illustrated in FIG. 1.

FIG. 14 shows the structure of the drive apparatus according to this embodiment used for driving the optical scanner 100. As shown in FIG. 14, the drive apparatus 300 includes: a coil drive device 310 used for applying a drive current to the drive coil 132; a voltage detection device 320 used for detecting the voltage between the both ends of the drive coil 132; a sample and hold device 330 used for holding a detection voltage of the voltage detection device 320; and a peak detection device 340 for detecting a substantial peak of a deflection angular velocity of the movable portion 112.

The coil drive device 310 applies a fixed current to the drive coil 132 only in a predetermined period. That is, the coil drive device 310 supplies a pulsed current to the drive coil 132. Of course, the predetermined period, i.e., the pulse width is shorter than $1/(2f)$ [second] (f: drive frequency [Hz]). The coil drive device 310 preferably supplies the pulsed current having a frequency equal to the resonance frequency $f_r$ of the optical scanner 100.

The sample and hold device 330 starts holding at a specific moment immediately before start of current application to start of the current application, and continues holding at least during current application. The sample and hold device 330 preferably releases holding in retard of end of current application. That is, the sample and hold device 330 releases holding after elapse of a predetermined time after end of current application.

The holding period is set longer than the current application period. Since the band of the circuit used in the voltage detection device 320 or the like is limited, a pulse width of the drive signal which appears in an output from the voltage detection device 320 becomes wider than the pulse width of the drive current. In order to completely eliminate the drive signal which appears in the output from the voltage detection device 320, a holding period is set longer than the current application period, i.e., the pulse width of the drive signal.

The peak detection device 340 detects a specific phase near the peak of the deflection angular velocity of the movable portion 112 based on an output from the sample and hold device 330. In detail, the peak detection device 340 detects a phase represented by $$90 - k \cdot d \cdot 360/T \text{ [degrees]} \tag{3}$$

where T is a cycle T of oscillation of the optical scanner 100 [second] (this is equal to an inverse number of the resonance frequency $f_r$ of the optical scanner 100), d is a pulse width of an output from the coil drive device [second], and k is an real number satisfying $0 \leq k \leq 1$.

The peak detection device 340 outputs a peak detection signal indicative of detection of a specific phase to the coil drive device 310. The coil drive device 310 applies a current to the drive coil 132 in accordance with a peak detection signal input thereto. In more detail, the coil drive device 310 supplies to the drive coil 132 a pulsed current which rises with a detection timing with a specific phase detected by the peak detection device 340.

As to the drive current supplied to the drive coil 132, the phase is fastest and the pulse is lowered with a peak of the deflection angular velocity when k=1 in the equation (3). Also, when k=0 in the equation (3), the phase is slowest, and the pulse rises with the peak of the deflection angular velocity. That is, the pulse of the drive current overlaps the peak of the deflection angular velocity.

Figure 15:
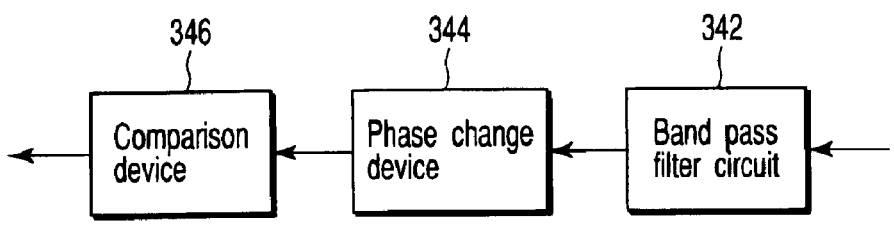
FIG. 15 shows a structure of a peak detection device illustrated in FIG. 14.

Specifically, as shown in FIG. 15, the peak detection device 340 includes: a band pass filter circuit 342 which selectively transmits therethrough only a component of the output signal from the sample and hold device 330 near the resonance frequency of the optical scanner 100; a phase change device 344 which changes a phase of an output signal from the band pass filter circuit 342; and a comparison device 346 which compares an output signal from the phase change device 344 with a specific level.

Again referring to FIG. 14, the drive device 300 includes: an amplitude detection device 350 which detects a deflection angle amplitude of the movable portion 112 based on an output signal from the sample and hold device 330; and an amplitude error detection device 360 which detects an error in the deflection angle amplitude of the movable portion 112 (i.e., deviation from a target value).

The amplitude error detection device 360 compares an output signal from the amplitude detection device 350 input thereto with a target amplitude signal, and outputs to the coil drive device 310 a current control signal indicative of a current to be supplied to the drive coil 132 in order to match the actual deflection angle amplitude of the movable portion 112 with a target value.

The coil drive device 310 changes the amplitude of the pulsed current which is supplied to the drive coil 132 based on the current control signal input from the amplitude error detection device 360. The coil drive device 310 preferably changes only the amplitude of the current without changing an application time of the current, i.e., the pulse width.

The amplitude detection device 350 outputs a signal corresponding to, e.g., an area of an alternating waveform of the output signal from the sample and hold device 330 for one cycle. Alternatively, the amplitude detection device 350 outputs a signal corresponding to an area of the alternating waveform of an output signal from the sample and hold device 330 for a half cycle.

Figure 16:
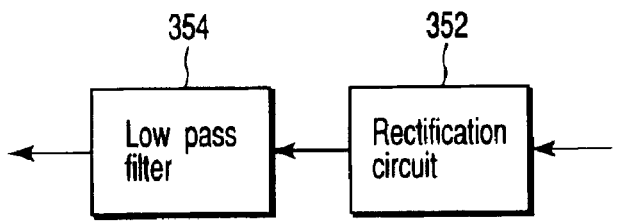
FIG. 16 shows a structure of an amplitude detection device illustrated in FIG. 14.

Therefore, as shown in FIG. 16, for example, the amplitude detection device 350 includes: a rectification circuit 352 which obtains an absolute value signal of an output from the sample and hold device 330; and a low pass filter 354 used for outputting a signal corresponding to an average value of an absolute value signal by smoothing an output from the rectification circuit 352.

As to a cutoff frequency of the low pass filter 354, a value which is sufficiently lower than the resonance frequency of the optical scanner 100 is preferably selected so as not to generate the ripple in the output.

The rectification circuit 352 is constituted by a full-wave rectification circuit with respect to an output of the signal corresponding to an area of an output signal from the sample and hold device 330 for one cycle, and constituted by a half-wave rectification circuit with respect to an output of the signal corresponding to an area of an output signal from the sample and hold device 330 for a half cycle.

First Drive Example

A first drive example is that the peak detection device 340 detects a peak of the deflection angular velocity of the movable portion 112, namely, a phase of 90 degrees of a waveform of the deflection angular velocity of the movable portion 112 based on an output from the sample and hold device 330 and the coil drive device 310 applies a current to the drive coil 132 with rising of the pulsed drive current matched with the timing. This corresponds to the case of k=0 in the equation (3).

Description will now be given as to the operation of the drive apparatus in such a drive.

In the following description, it is assumed that the peak detection device 340 correctly detects the peak of the deflection angular velocity of oscillation of the movable portion 112 caused due to immediately preceding application of the pulsed current to the drive coil 132.

Figure 17:
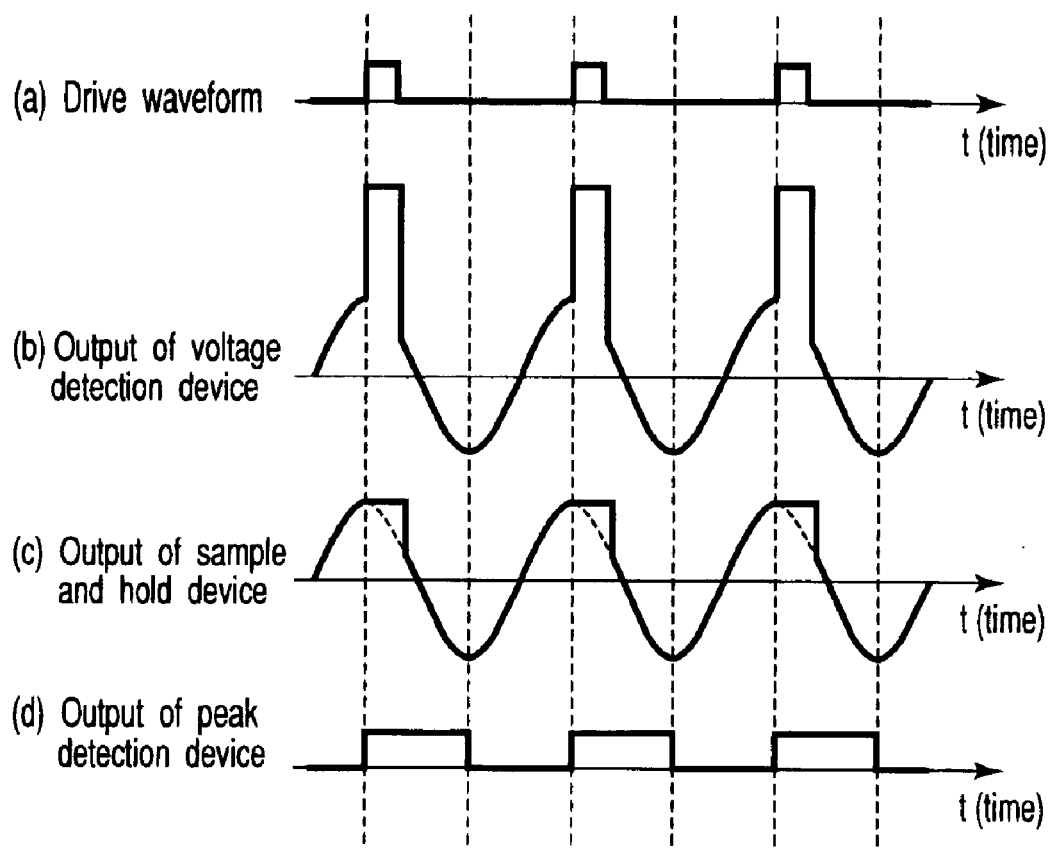
FIG. 17 shows an output (drive waveform) from a coil drive device, an output from a voltage detection device, an output from a sample and hold device, and an output from a peak detection device of the drive apparatus in FIG. 14, which drives the optical scanner in FIG. 1 with a rectangular wave having the single polarity in accordance with a first drive example (90° phase detection of the deflection angular velocity waveform)

The peak detection device 340 outputs a peak detection signal which informs of detection of the peak of the deflection angular velocity. Specifically, as will be described later, as shown in FIG. 17 under item (d), an output from the peak detection device 310, i.e., the peak detection signal has a rectangular pulse waveform which rises in synchronization with the peak of the deflection angular velocity.

The coil drive device 310 starts application of a fixed current to the drive coil 132 in accordance with rising of the peak detection signal. Thereafter, the coil drive device 310 stops application of a fixed current to the drive coil 132 after elapse of a predetermined time. As a result, the coil drive device 310 supplies to the drive coil 132 a current with a rectangular pulse waveform which has a frequency equal to the resonance frequency of the optical scanner 100 and rises with a timing corresponding to the peak of the deflection angular velocity.

Here, although application of the current by the coil drive device 310 is performed in a fixed time, the coil drive device 310 may terminate application of the current when the phase of an output signal from the voltage detection device or an output signal from the sample and hold device matches with a predetermined value. In this case, a duty ratio of the drive current signal can be maintained constant with respect to fluctuations of the resonance frequency.

As described above, in accordance with application of the current to the drive coil 132, the movable portion 112 of the optical scanner 100 oscillates due to the Lorentz force generated between the drive coil 132 and the magnetic circuit 150. The inverse electromagnetic force is generated to the drive coil 132 due to oscillation of the movable portion 112. This inverse electromagnetic force is proportionate to the deflection angular velocity of the movable portion 112.

The voltage detection device 320 detects the voltage between the both ends of the drive coil 132 of the optical scanner 100. When the optical scanner 100 is driven with the resonance frequency, the phase of the waveform of the deflection angular velocity matches with the phase of the waveform of the fundamental frequency component of the drive current as described above in connection with FIG. 7. Therefore, the output from the voltage detection device 320 has a waveform that the pulse waveform of the drive current overlap the sinusoidal waveform of the deflection angular velocity as shown in FIG. 17 under item (b).

The sample and hold device 330 holds an output from the voltage detection device 320 in accordance with rising of the peak detection signal. Thereafter, the sample and hold device 330 releases holding in retard of end of the current application. As a result, as shown in FIG. 17 under item (c), the sample and hold device 330 outputs a signal obtained by eliminating the pulsed waveform caused due to the drive current from the output signal of the voltage detection device 320, as shown in FIG. 17 under item (c). As to an output waveform of the sample and hold device 330, the fundamental frequency matches with a frequency of the deflection angle, and an average value of an absolute value is in proportion to the amplitude of the deflection angle.

The sample and hold device may release or terminate holding when the phase of the output signal from the voltage detection device or the output signal from the sample and hold device matches with a predetermined value. In this case, it is possible to maintain the perfect similarity of the shape of the output signal from the sample and hold device with respect to fluctuations of the resonance frequency.

The peak detection device 340 detects a peak of the deflection angular velocity of the movable portion 112, namely, the phase of 90 degrees. As described above, the peak detection device 340 includes a band pass filter circuit 342, a phase change device 344 and a comparison device 346 as shown in FIG. 15.

In order to detect the phase of 90 degrees of the deflection angular velocity of the movable portion 112, for example, the phase change device 344 changes the phase of the output signal from the band pass filter circuit 342 in such a manner that the phase of the output signal from the phase change device 344 becomes −90 degrees relative to the phase of the output signal from the voltage detection device 320. In other words, in the resonance frequency of the optical scanner 100, a sum of changes in phase by the voltage detection device 320, the sample and hold device 330, the band pass filter circuit 342 and the phase change device 344 is equal to −90 degrees.

Further, the comparison device 346 compares an output from the phase change device 344 with the zero potential, and outputs a binary signal indicative of a result of this comparison. As a result, an output from the peak detection device 340 has a rectangular pulse waveform which rises in synchronization with the peak of the deflection angular velocity as shown in FIG. 17 under item (d).

The coil drive device 310 supplies to the drive coil 132 the current with the rectangular pulse waveform which rises in synchronization with rising of the peak detection signal as shown in FIG. 17 under item (a).

In the first drive example, since the drive device 300 according to this embodiment supplies to the drive coil 132 the drive current signal with the pulsed waveform which rises in synchronization with the peak of the deflection angular velocity.

Figure 18:
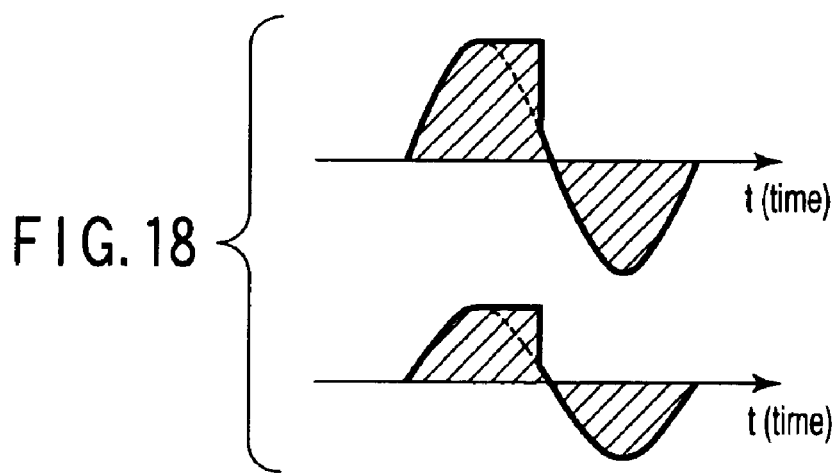
FIG. 18 shows one cycle of output signals from the sample and hold device for two types of pulsed drive current waveforms having different amplitudes.

As described above, the amplitude detection device 350 includes the rectification circuit 352 and the low pass filter 354, and outputs a signal corresponding to an area of the alternating waveform of the output signal from the sample and hold device 330 for one cycle as shown in FIG. 18, for example. Here, an area of the alternating waveform for one cycle is an area surrounded by the central axis of the amplitude and the waveforms of the phases from 0 degree to 360 degrees.

The area of the alternating waveform for one cycle represents an average value of an absolute value signal of the alternating waveform for one cycle. In FIG. 18, an area of the shaded area is in proportion to the amplitude of the deflection angular velocity, and the amplitude of the deflection angular velocity is in proportion to the amplitude of the deflection angle. Therefore, an average value of the absolute value signals output from the amplitude detection device 350 is in proportion to the amplitude of the deflection angle of the movable portion 112.

The amplitude error detection device 360 compares the output signal of the amplitude detection device 350 with a target amplitude signal, obtains a current value of a constant current which should be applied to the drive coil, i.e., the amplitude of the pulsed current waveform in order to match the deflection angle amplitude of the movable portion 112 with a target value, and outputs the current control signal indicative of the obtained amplitude to the coil drive device 310.

The coil drive device 310 changes only the current value of the constant current which should be applied to the drive coil 132, i.e., the amplitude of the pulsed current waveform in accordance with the current control signal. That is, the coil drive device 310 changes the current value of the constant current, i.e., the amplitude of the pulsed current waveform while maintaining the application time of the current, i.e., the pulse width constant. That is, the deflection angle amplitude of the movable portion 112 is adjusted.

Further, the coil drive device 310 may terminate application of the current when the phase of the output signal from the voltage detection device or the output signal from the sample and hold device matches with a predetermined value. In this case, a duty ratio of the drive current signal can be maintained constant with respect to fluctuations in the resonance frequency.

FIG. 18 shows the alternating waveform of an output signal from the sample and hold device 330 for one cycle with respect to two types of pulsed drive current waveforms having different amplitudes. As apparent from FIG. 18, the waveform, i.e., the shape of the shaded part does not vary in the horizontal direction but varies only in the vertical direction with respect to change in amplitude of the pulsed current waveform. That is, the shaded part is independently increased or decreased in the vertical direction due to changes in amplitude of the pulsed current waveform. Therefore, an area for one cycle, namely, an area of the shaded part is in proportion to the amplitude of the pulsed current waveform.

In this manner, since the drive device 300 according to this embodiment adjusts the deflection angle amplitude of the movable portion 112 by changing the amplitude of the drive current signal, the amplitude adjustment range is not substantially restricted.

Although the above has described the drive by using the pulsed current with the waveform having only the single polarity shown in FIG. 17 under item (a), the similar drive is possible with the pulsed current with the waveform having the both polarities shown in FIG. 19 under item (a).

In this case, in response to supply of the current with the rectangular pulse waveform having the both polarities shown in FIG. 19 under item (a) to the drive coil 132, the voltage detection device 320 outputs the waveform that the pulse waveform of the drive current overlaps the sinusoidal waveform of the deflection angular velocity shown in FIG. 19 under item (b), the sample and hold device 330 outputs the waveform obtained by eliminating the pulsed waveform due to the drive current from the output signal of the voltage detection device 320 shown in FIG. 19 under item (c), and the peak detection device 340 outputs the rectangular pulse waveform which rises in synchronization with the peak of the deflection angular velocity shown in FIG. 19 under item (d).

The coil drive device 310 outputs the positive pulse of the drive waveform in synchronization with rising of the output waveform of the peak detection device 340, and outputs the negative pulse of the drive waveform in synchronization with, e.g., rising of the signal waveform obtained by changing the phase of the output waveform of the peak detection device 340 by 180 degrees. Alternatively, the peak detection device 340 may further detect the minimum (bottom) of the deflection angular velocity, and the coil drive device 310 may output the negative pulse of the drive waveform in synchronization with rising of the output waveform.

Furthermore, the waveform of the current applied from the coil drive device to the coil may not be the rectangular pulse waveform but the waveform obtained by cutting out the sinusoidal waveform or the like with the drive pulse width. In this case, the components other than the resonance frequency contained in the drive signal can be decreased.

In the above description, although a quantity of phase change of the phase change device of the peak detection device is −90 degrees, drive can be also performed in synchronization with the phase of 90−d·180/T degrees of the deflection angular velocity in the structure that a quantity of phase change in the phase change device is 90 degrees. In this case, the drive pulse is output in synchronization with falling of an output from the comparison device.

Second Drive Example

The second drive example is drive that the center of the pulse of the drive current corresponds to the peak of the deflection angular velocity of the movable portion 112. In detail, this drive is that the peak detection device 340 detects the phase of 90−d·180/T degrees of the waveform of the deflection angular velocity of the movable portion 112 based on an output from the sample and hold device 330 and the coil drive device 310 supplies to the drive coil 132 the pulsed drive current which rises with that timing. This corresponds to the case of k=½ in the above-described equation (3).

Description will now be given as to the operation of the drive device in such a drive.

The coil drive device 310 starts application of the constant current with respect to the drive coil 132 in accordance with rising of the peak detection signal shown in FIG. 20 under item (d). Thereafter, the coil drive device 310 stops application of the constant current to the drive coil 132 after elapse of a predetermined time. As a result, as shown in FIG. 20 under item (a), the coil drive device 310 supplies to the drive coil 132 a current with the rectangular pulse waveform which has a frequency equal to the resonance frequency of the optical scanner 100 and rises before the peak of the deflection angular velocity. Supply of the pulsed current to the drive coil 132 oscillates the movable portion 112 of the optical scanner 100. Oscillation of the movable portion 112 generates the inverse electromotive force which depends on the deflection angular velocity in the drive coil 132.

Figure 21:
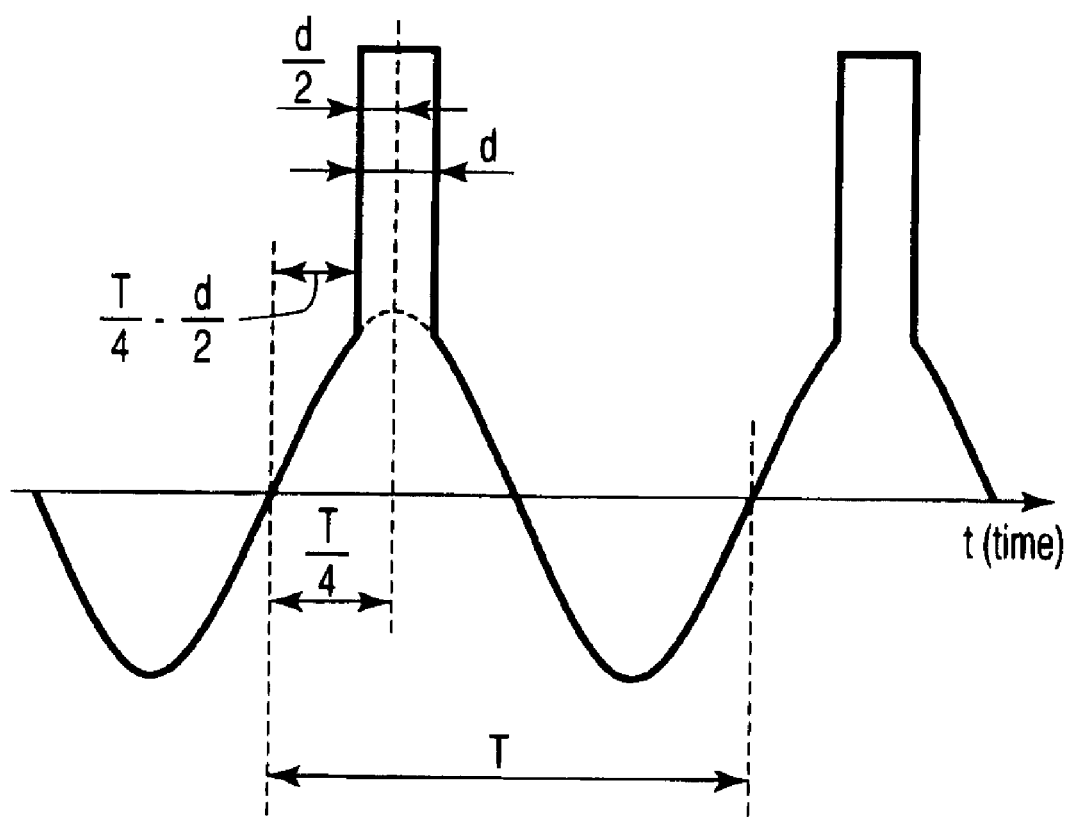
FIG. 21 is an enlarged view of the output from the voltage detection device illustrated in FIG. 20.

The voltage detection device 320 detects the voltage between the both ends of the drive coil 132 of the optical scanner 100. As shown in FIG. 20 under item (b), an output from the voltage detection device 320 has a waveform that the pulse waveform of the drive current overlaps the sine wave of the deflection angular velocity. In detail, as shown in FIG. 21, the output from the voltage detection device 320 has a waveform that the pulse with a time width d which rises with T/4−d/2 overlaps the sine wave of the deflection angular velocity in a cycle T. The center of the pulse coincides with the peak of the deflection angular velocity of the movable portion 112. Rising of the pulse is 90−d·180/T degrees in terms of phase.

The sample and hold device 330 holds an output from the voltage detection device 320 in accordance with rising of the peak detection signal. Thereafter, the sample and hold device 330 releases holding in retard with end of current application. As a result, as shown in FIG. 20 under item (c), the output from the sample and hold device 330 has a waveform obtained by eliminating the pulsed waveform due to the drive current from the output signal of the voltage detection device 320.

The peak detection device 340 detects the phase of 90−d·180/T degrees of the deflection angular velocity of the movable portion 112. Therefore, the phase change device 344 changes the phase of the output signal of the band pass filter circuit 342 in such a manner that the phase of the output signal from the phase change device 344 has −(90−d·180/T) degrees relative to the phase of the output signal from the voltage detection device 320. Further, the comparison device 346 compares the output from the phase change device 344 with the zero potential, and outputs a binary signal indicative of a result of this comparison. Consequently, as shown in FIG. 20 under item (d), an output from the peak detection device 340 has a rectangular pulse waveform which rises in synchronization with the phase with 90−d·180/T degrees of the deflection angular velocity.

As shown in FIG. 20 under item (a), the coil drive device 310 supplies to the drive coil 132 a current with a rectangular pulse waveform which rises in synchronization with rising of the peak detection signal.

In the second drive example, since the drive apparatus 300 according to this embodiment supplies to the drive coil 132 the drive current signal having a pulse waveform that the center of the time width matches with the peak of the deflection angular velocity, the optical scanner 100 can be further efficiently driven.

Although the embodiments according to the present invention have been described with reference to the accompanying drawings, the present invention is not restricted to these embodiments, and various modifications or changes may be carried out without departing from the scope of the invention.

For example, the waveform of the current applied from the coil drive apparatus to the coil may not be the rectangular pulse waveform but a waveform obtained by cutting out the sine wave or the like by using the drive pulse width. In this case, components other than the resonance frequency included in the drive signal can be decreased.

In the above description, although a quantity of phase change of the phase change device in the peak detection device is −(90−d·180/T) degrees, drive can be performed in synchronization with the phase of 90−d·180/T degrees of the deflection angular velocity in the structure that a quantity of phase change of the phase change device is (90+d·180/T) degrees. In this case, the drive pulse is output in synchronization with falling of the output from the comparison device.

Further, although the amplitude detection device 350 obtains the deflection amplitude of the movable portion 112 based on an output from the sample and hold device 330 in the above description, the deflection amplitude may be obtained based on an output from the band pass filter circuit 342 in the peak detection device 340.

Furthermore, in order to detect the 90-degree phase of the deflection angular velocity of the movable portion 112, the phase of an output signal from the band pass filter circuit 342 is changed in such a manner that the phase of the output signal from the phase change device 344 becomes −(90−k·d·360/T) degrees with respect to the phase of the output signal from the voltage detection device 320 in the phase change device 344, and an output from the phase change device 344 is compared with the zero potential in the comparison device 346. However, a quantity of phase to be changed or a potential used for comparison is not restricted to each of these values, and they may be appropriately changed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A drive apparatus for an electromagnetic drive type actuator, which comprises a movable element, a fixed element, a connection element connecting the movable element and the fixed element to allow the movable element to oscillate with respect to the fixed element, a magnetic field generation element provided to one of the fixed element and the movable element, and a drive coil provided to the other one of the fixed element and the movable element, the movable element being caused to oscillate with respect to the fixed element in accordance with a force generated by the interaction between a current flowing through the drive coil and a magnetic field generated by the magnetic field generation element, the drive apparatus comprising:

a drive signal supply element, which supplies to the drive coil a current signal with a periodic waveform that has a frequency substantially equal to a resonance frequency of the movable element and whose current value is zero in a fixed period in one cycle; and an oscillation detection element, which detects an oscillation state based on a timing of a zero-cross point of a voltage waveform between both ends of the drive coil in a period corresponding to the period in which the current value is zero.

2. The drive apparatus for an electromagnetic drive type actuator according to claim 1, wherein the waveform of the current signal supplied to the drive coil is a part of a sine wave in a period excluding the period in which the current value is zero in one cycle.

3. The drive apparatus for an electromagnetic drive type actuator according to claim 2, wherein the movable element has a flat plate shape, and the drive coil comprises a flat coil.

4. A drive apparatus for an electromagnetic drive type actuator, which comprises a movable element, a fixed element, a connection element connecting the movable element and the fixed element to allow the movable element to oscillate with respect to the fixed element, a magnetic field generation element provided to one of the fixed element and the movable element, and a drive coil provided to the other one of the fixed element and the movable element, the movable element being caused to oscillate with respect to the fixed element in accordance with a force generated by the interaction between a current flowing through the drive coil and a magnetic field generated by the magnetic field generation element, the drive apparatus comprising:

a drive signal supply element, which supplies to the drive coil a current signal with a periodic waveform which has a frequency substantially equal to a resonance frequency of the movable element and whose current value is zero in a fixed period in one cycle; and an oscillation detection element, which detects amplitude information of the movable element based on an root mean square value of a voltage waveform between both ends of the drive coil for a half cycle in a period corresponding to the period in which the current value is zero.

5. The drive apparatus for an electromagnetic drive type actuator according to claim 4, wherein the waveform of the current signal supplied to the drive coil is a part of a sine wave in a period excluding the period in which the current value is zero in one cycle.

6. The drive apparatus for an electromagnetic drive type actuator according to claim 5, wherein the movable element has a flat plate shape, and the drive coil comprises a flat coil.

7. A method for driving an electromagnetic drive type actuator, which comprises a movable element, a fixed element, a connection element connecting the movable element and the fixed element to allow the movable element to oscillate with respect to the fixed element, a magnetic field generation element provided to one of the fixed element and the movable element, and a drive coil provided to the other one of the fixed element and the movable element, the movable element being caused to oscillate with respect to the fixed element in accordance with a force generated by the interaction between a current flowing through the drive coil and a magnetic field generated by the magnetic field generation element, the method comprising:

supplying to the drive coil a current signal with a periodic waveform that has a frequency substantially equal to a resonance frequency of the movable element and whose current value is zero in a fixed period in one cycle; and detecting an oscillation state based on a timing of a zero-cross point of a voltage waveform between both ends of the drive coil in a period corresponding to the period in which the current value is zero.

8. The method for driving an electromagnetic drive actuator according to claim 7, wherein the waveform of the current signal supplied to the drive coil is a part of a sine wave in a period excluding the period in which the current value is zero in one cycle.

9. The method for driving an electromagnetic drive actuator according to claim 8, wherein the movable element has a flat plate shape, and the drive coil comprises a flat coil.

10. A method for driving an electromagnetic drive type actuator, which comprises a movable element, a fixed element, a connection element connecting the movable element and the fixed element to allow the movable element to oscillate with respect to the fixed element, a magnetic field generation element provided to one of the fixed element and the movable element, and a drive coil provided to the other one of the fixed element and the movable element, the movable element being caused to oscillate with respect to the fixed element in accordance with a force generated by the interaction between a current flowing through the drive coil and a magnetic field generated by the magnetic field generation element, the method comprising:

supplying to the drive coil a current signal with a periodic waveform which has a frequency substantially equal to a resonance frequency of the movable element and whose current value is zero in a fixed period in one cycle; and detecting amplitude information of the movable element based on an root mean square value of a voltage waveform between both ends of the drive coil for a half cycle in a period corresponding to the period in which the current value is zero.

11. The method for driving an electromagnetic drive type actuator according to claim 10, wherein the waveform of the current signal supplied to the drive coil is a part of a sine wave in a period excluding a period in which a current value is zero in one cycle.

12. The drive apparatus for an electromagnetic drive type actuator according to claim 11, wherein the movable element has a flat plate shape, and the drive coil comprises a flat coil.

13. A drive apparatus for driving an electromagnetic drive type actuator, which comprises a movable element, a fixed element, a connection element connecting the movable element and the fixed element, a magnetic field generation element fixed to one of the fixed element and the movable element, and a drive coil fixed to the other one of the fixed element and the movable element, the movable element being caused to oscillate in a resonance state with respect to the fixed element by utilizing a force acting between the drive coil and the magnetic field generation element by supplying a pulsed current to the drive coil, the drive apparatus comprising:

a coil drive device for applying a current to the drive coil only in a predetermined period;

a voltage detection device for detecting a voltage between both ends of the drive coil;

a sample and hold device for holding a detected voltage of the voltage detection device at least during current application in a specific period immediately before start of current application to start of current application; and a peak detection device for detecting a specific phase near a peak of a deflection angular velocity of the movable element based on an output from the sample and hold device, the coil drive device starting application of a current in accordance with a detection timing of the specific phase detected by the peak detection device.

14. The drive apparatus for an electromagnetic drive type actuator according to claim 13, wherein the coil drive device applies a constant current to the drive coil only in a predetermined period.

15. The drive apparatus for an electromagnetic drive type actuator according to claim 13, wherein the peak detection device detects a phase of 90−k·d·360/T degrees (where, T is a cycle [second] corresponding to an inverse number of a resonance frequency of the actuator, d is a pulse width [second] of an output from the coil drive device, and k is an real number satisfying 0≦k≦1) of the deflection angular velocity of the movable element.

16. The drive apparatus for an electromagnetic drive type actuator according to claim 15, wherein the peak detection device detects a phase of 90 degrees of the deflection angular velocity of the movable element.

17. The drive apparatus for an electromagnetic drive type actuator according to claim 15, wherein the peak detection device detects a phase of 90−d·180/T degrees of the deflection angular velocity of the movable element.

18. The drive apparatus for an electromagnetic drive type actuator according to claim 13, wherein the peak detection device for the deflection angular velocity includes: a band pass filter circuit, which selectively transmits therethrough only a component near a resonance frequency of the actuator in the output signal from the sample and hold device; a phase change device, which changes a phase of an output signal from the band pass filter circuit; and a comparison device, which compares an output signal from the phase change device with a specific level.

19. The drive apparatus for an electromagnetic drive type actuator according to claim 18, wherein the phase change device changes the phase of the output signal from the band pass filter circuit in such a manner that a phase of an output signal from the phase change device becomes +90 degrees or −90 degrees with respect to a phase of an output signal from the voltage detection device.

20. The drive apparatus for an electromagnetic drive type actuator according to claim 18, wherein the phase change device changes the phase of the output signal from the band pass filter circuit in such a manner that a phase of an output signal from the phase change device becomes +90(T+2d)/T degrees or −90(T−2d)/T degrees (where, T is a cycle [second] corresponding to an inverse number of a resonance frequency of the actuator, and d is a pulse width [second] of an output from the coil drive device) with respect to a phase of an output signal from the voltage detection device.

21. The drive apparatus for an electromagnetic drive type actuator according to claim 13, wherein the sample and hold device releases holding in retard of end of current application by the coil drive device.

22. The drive apparatus for an electromagnetic drive type actuator according to claim 21, wherein release of holding by the sample and hold device is determined based on a phase of an output signal from the voltage detection device.

23. The drive apparatus for an electromagnetic drive type actuator according to claim 21, wherein release of holding by the sample and hold device is determined based on a phase of the output signal from the sample and hold device.

24. The drive apparatus for an electromagnetic drive type actuator according to claim 13, further comprising: an amplitude detection device, which detects a deflection angle amplitude of the movable element based on the output signal from the sample and hold device; and an amplitude error detection device, which detects an error in deflection angle amplitude of the movable element with respect to a target value, the coil drive device changing an amplitude of the pulsed current supplied to the drive coil based on an output signal from the amplitude error detection device.

25. The drive apparatus for an electromagnetic drive type actuator according to claim 24, wherein the coil drive device changes only an amplitude of a current without changing an application time of a current.

26. The drive apparatus for an electromagnetic drive type actuator according to claim 24, wherein the amplitude detection device outputs a signal corresponding to an area of an alternating waveform of the output signal from the sample and hold device for one cycle.

27. The drive apparatus for an electromagnetic drive type actuator according to claim 26, wherein the amplitude detection device includes a full-wave rectification circuit and a low pass filter.

28. The drive apparatus for an electromagnetic drive type actuator according to claim 24, wherein the amplitude detection device outputs a signal corresponding to an area of an alternating waveform of the output signal from the sample and hold device for a half cycle.

29. The drive apparatus for an electromagnetic drive type actuator according to claim 28, wherein the amplitude detection device includes a half-wave rectification circuit and a low pass filter.

30. The drive apparatus for an electromagnetic drive type actuator according to claim 24, wherein termination of application of current of the coil drive device is determined based on a phase of an output signal from the voltage detection device.

31. The drive apparatus for an electromagnetic drive type actuator according to claim 24, wherein termination of application of current of the coil drive device is determined based on a phase of the output signal from the sample and hold device.

32. The drive apparatus for an electromagnetic drive type actuator according to claim 18, further comprising: an amplitude detection device, which detects a deflection angle amplitude of the movable element based on the output signal from the sample and hold device or the output signal from the band pass filter circuit; and an amplitude error detection device, which detects an error with respect to a target value of a deflection angle amplitude of the movable element, the coil drive device changing an amplitude of the pulsed current supplied to the drive coil based on an output signal from the amplitude error detection device.

33. The drive apparatus for an electromagnetic drive type actuator according to claim 32, wherein the coil drive device changes only an amplitude of a current without changing application time of the current.

34. The drive apparatus for an electromagnetic drive type actuator according to claim 32, wherein the amplitude detection device outputs a signal corresponding to an area of an alternating waveform of the output signal from the sample and hold device or the output signal from the band pass filter circuit for one cycle.

35. The drive apparatus for an electromagnetic drive type actuator according to claim 34, wherein the amplitude detection device includes a full-wave rectification circuit and a low pass filter.

36. The drive apparatus for an electromagnetic drive type actuator according to claim 32, wherein the amplitude detection device outputs an signal corresponding to an area of an alternating waveform of the output signal from the sample and hold device or the output signal from the band pass filter circuit for a half cycle.

37. The drive apparatus for an electromagnetic drive type actuator according to claim 36, wherein the amplitude detection device includes a half-wave rectification circuit and a low pass filter.

38. The drive apparatus for an electromagnetic drive type actuator according to claim 32, wherein termination of application of a current of the coil drive device is determined based on a phase of an output signal from the voltage detection device.

39. The drive apparatus for an electromagnetic drive type actuator according to claim 32, wherein termination of application of a current of the coil drive device is determined based on a phase of the output signal from the sample and hold device.

* * * * *